United States Patent [19]
McKnight

[11] 3,718,989
[45] March 6, 1973

[54] AIRCRAFT SIMULATOR VISUAL SYSTEM

[75] Inventor: Robert A. McKnight, Binghamton, N.Y.

[73] Assignee: The Singer Company, New York, N.Y.

[22] Filed: Sept. 28, 1970

[21] Appl. No.: 76,657

[52] U.S. Cl.......................35/12 N, 35/11, 35/42.5, 353/85
[51] Int. Cl.............................B64g 7/00, G09b 9/08
[58] Field of Search............35/11, 12 N, 12 K, 42.5; 350/174; 353/62, 85

[56] References Cited

UNITED STATES PATENTS

| | | | |
|---|---|---|---|
| 2,961,778 | 11/1960 | De Florez et al. | 35/12 K |
| 2,046,202 | 6/1936 | Miles | 35/11 |
| 2,763,183 | 9/1956 | Liversidge | 35/42.5 |

Primary Examiner—Robert W. Michell
Assistant Examiner—L. R. Oremland
Attorney—Francis L. Masselle, William Grobman and Charles S. McGuire

[57] ABSTRACT

A visual simulation system for a flight trainer, or the like, comprising a spherical transparency for projection on a suitable viewing surface by a point light source located within the sphere. Three axes of rotational movement are provided for imparting visual attitude cues to the student, and special mechanism comprising a four-bar parallelogram linkage is provided for maintaining proper positional relationships during simulated motion in the roll axis.

8 Claims, 5 Drawing Figures

Robert A. McKnight
INVENTOR.

BY Charles S. McGuire
ATTORNEY

Robert A. McKnight
INVENTOR.

BY Charles L. McGuire
ATTORNEY

AIRCRAFT SIMULATOR VISUAL SYSTEM

The present invention relates to visual simulation systems, and more particularly to a simplified, projected image transparency system wherein proper visual cues are presented to the student pilot of a grounded flight trainer while performing simulated pitch, roll, and heading maneuvers.

In order to obtain maximum training value from fixed-base aircraft trainers or simulators, it has become increasingly popular to provide such trainers with a visual simulation system. These systems vary in complexity and sophistication from a fixed scene positioned in the student's field of view to appear as a real world scene as viewed from an arbitrary, fixed point in space to computer-controlled image alteration systems with infinity image or CRT displays. The present invention is somewhere between these two extremes in complexity of operation and fidelity of simulation, comprising basically a scene projected on a viewing surface from a spherical transparency by a point light source. The transparency is rotatable about three mutually perpendicular axes through the center of the sphere as a function of simulated movement about the same axes of the aircraft represented by the trainer in which the student is located. Such movements of the spherical transparency may be, and preferably are, coordinated with actual rotational movement of the trainer so that the student receives perceptible motion and visual cues which are close enough to the real world situations being simulated that significantly transferable training value is obtained.

It is to be noted at the outset that the disclosed embodiment of the present invention is intended to provide only an attitude visual reference to provide early training in the elemental contact flying skills required for satisfactory flight. That is, the student is fixed in space with respect to the displayed scene as far as translational movement is concerned. Other means, outside the scope of the present invention, may be provided to impart a visual sense of translational movement, but are not described herein.

Since the center of the spherical transparency is laterally displaced to some extent from the sutdent's eye position, it is necessary that the location of the point light source be displaced from the center of the sphere in order that the projected image appear in the desired relationship to the student's eye position. For example, in typical general aviation applications it is desirable to display an image in such relationship to the student as a corresponding real world scene would appear from an altitude of several thousand feet. Thus, with the spherical transparency positioned in a convenient location, such as directly above a student seated in a trainer cockpit, and a spherical transparency with a horizon line in a horizontal plane through the center of the sphere, it is necessary to position the light source above the center in order to project the horizon line approximately at the student's eye level. In order to simulate visually rotational movements of an actual aircraft relative to the real world during various flight maneuvers, the transparency is rotated so that the image is displayed in a different angular relationship to the trainer. For roll motion of the aircraft about its own longitudinal axis, for example, the transparency is rotated about an axis through its own center and parallel to the roll axis of the trainer. The center of the sphere, of course, does not move during such rotation. If, however, the point form which the projecting light emanates is shifted relative to (i.e., rotated about) the center of this sphere, the horizon line of the projected image will be shifted as well as rotated. This will give a visual impression to a student in the trainer of being physically positioned outside the actual aircraft and rotated with respect thereto. That is, it will appear to the student that he is suspended on a long pendulum extending from the roll axis of the aircraft, rather than being positioned on the axis.

It is a principal object of the present invention to overcome the objectionable feature pointed out above in a spherical transparency visual system used in conjunction with a grounded flight trainer. More specifically, the invention is directed to providing a system for projecting an image from a spherical transparency with a point light source displaced from the center of the sphere, and including means for imparting a realistic relationship between the projected image and a viewer, likewise displaced from the center of the sphere, as the latter is rotated about its center.

A further object is to provide means for projecting an image from a spherical transparency with a point light source mounted within the sphere, displaced from the center thereof, with means for maintaining the position of the point light source stationary with respect to the center of the sphere as the latter is rotated.

Still another object is to provide an improved visual system of the projected image type with means for creating a realistic illusion of movement of the viewer with respect to a real world scene represented by the projected image.

A further object is to provide means for projecting an image in such relation to a viewer that his apparent position is displaced from his actual position, and for maintaining such apparent position during movement of the image source with respect to the actual position.

Other objects will in part appear hereinafter and will in part be obvious.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings in which.

Figure 1:
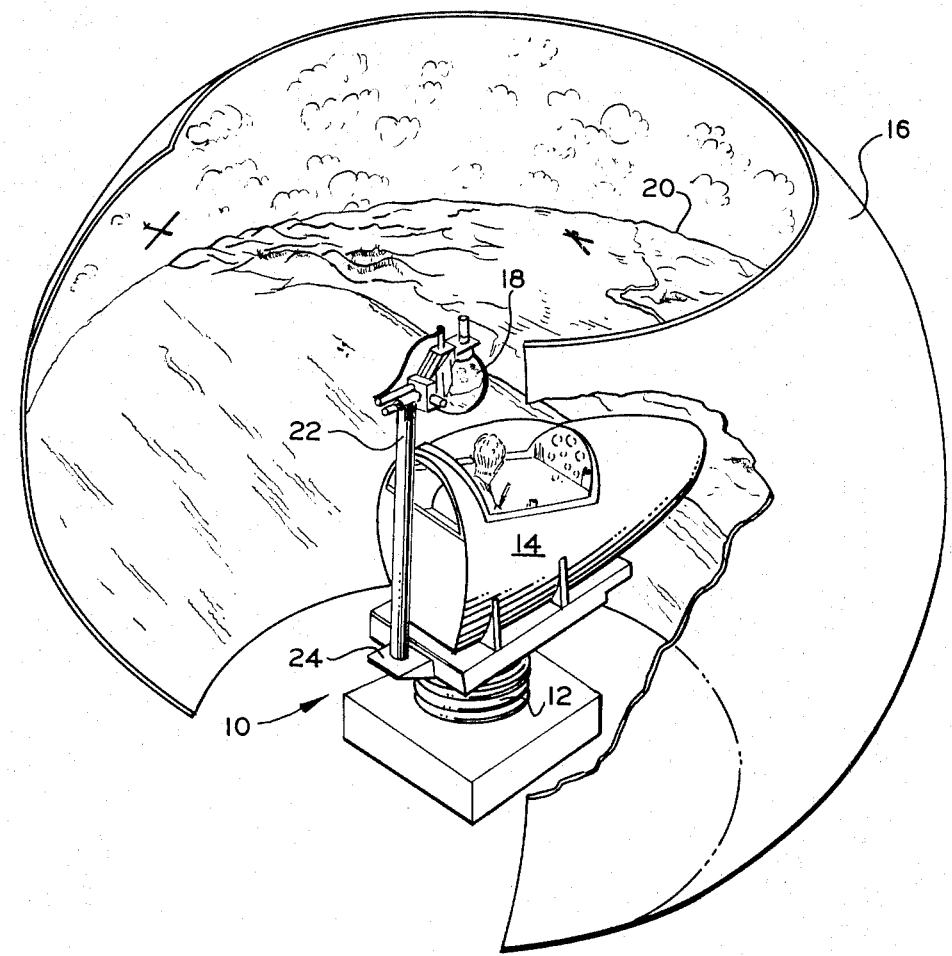
FIG. 1 is a perspective view, partly broken away, showing an example of the general environment of use of the invention.

As previously mentioned, the visual system of the present invention is relatively simple and in expensive, and is therefore intended primarily for use with helicopter or small fixed-wing aviation trainers. An example of such a grounded aviation trainer is shown in FIG. 1 and designated generally by the reference numeral 10. The trainer is mounted on a motion base 12 which may comprise any of a number of conventional mechanisms for providing limited motion to the student station 14 of trainer 10. When used in conjunction with the visual system of the present invention, the trainer motion system preferably provides motion in at least the pitch and roll axes, and may also provide heading or yaw motion. Suitable mechanism for moving student station 14 in the three rotational degrees of freedom in response to movement of the trainer controls is shown in U.S. Pat. No. 3,494,052. Although translational movement may also be provided, it is generally unrelated to operation of the disclosed embodiment of the visual system.

Partially surrounding trainer 10 at a suitable distance is curved projection screen 16 which receives an image projected from spherical transparency 18 for viewing by a student seated in the trainer. The projected image represents a real word scene photographed from an altitude of several thousand feet and displayed on screen 16 with horizon line 20 approximately on a horizontal line with the student's eye position when trainer 10 is in an attitude representing straight and level flight. Thus, the scene displayed on screen 16 will appear to the student in the trainer approximately as the real world scene would appear from an actual aircraft at the altitude from which the photograph comprising transparency 18 was taken. As described in more detail later, transparency 18 is supported for movement in the three rotational degrees of freedom by suitable mechanism mounted on column 22 extending from support 24 which is affixed to student station 14 for movement therewith.

Figure 2:
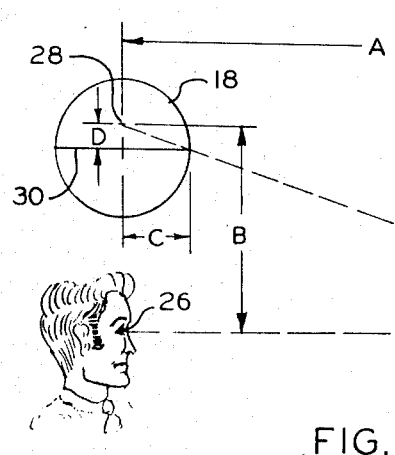
FIG. 2 is a diagrammatic showing of certain physical relationships in the construction and use of the invention.

FIG. 2 illustrates the geometric relationships with which the present invention is concerned. The relative position of transparency 18 and screen 16 are shown, as well as the trainee's eye position 26 and a point 28 representing the position of the projecting light source. The radius of curvature of screen 16 is represented by dimension $A$, the vertical distance between eye position 26 and point 28 by dimension $B$, the radius of transparency 18 by dimension $C$, and the displacement of point 28 from the center of the sphere by dimension $D$. Eye position 26 is assumed to be located at distance $A$ from screen 16, that is, at the center of the radius of curvature of the screen. From similar triangles, it may be seen that $D = BC/A$, thus providing easy calculation of the position of point 28 assuming horizon line 20 is to be substantially at the trainee's eye level as projected from a horizontal equator 30 of transparency 18.

In a typical aircraft of the type simulated in the present invention, the pilot's line of sight is substantially coincident with the longitudinal or roll axis of the aircraft. This, as the aircraft executes a roll maneuver with no heading or pitch change, a point on the horizon directly in the pilot's forward line of sight will not be shifted, while relative rotation of the pilot's body axis and the horizon take place. In the illustrated visual system, however, if point 28 is fixed within sphare 18 (that is, if point 28 is assumed to be attached to sphere 18 for movement therewith) then rotation of the sphere about an axis through its center and parallel with the trainee's line of sight, would result in a lateral shifting of horizon line 20. Although the point on equator 30 through which the axis of rotation passes would remain stationary, point 28 would be rotated about this axis, thereby shifting the projected image of the horizon point which was directly in the trainee's forward line of sight. By way of example, if the simulated scene represented a point 8,000 feet above the ground, the roll axis of the projector was 18 inches above the trainee's eye level, and the projection screen 16 feet in diameter, the trainee's apparent visual position as indicated by shift in the horizon during roll movement would be 1,500 feet below the simulated aircraft. With no correction, this error would obviously be very objectionable. The present invention provides means to correct this error by providing structure to maintain the position of point 28 stationary (that is, always located vertically above the center of the spherical transparency at distance $D$).

Figure 3:
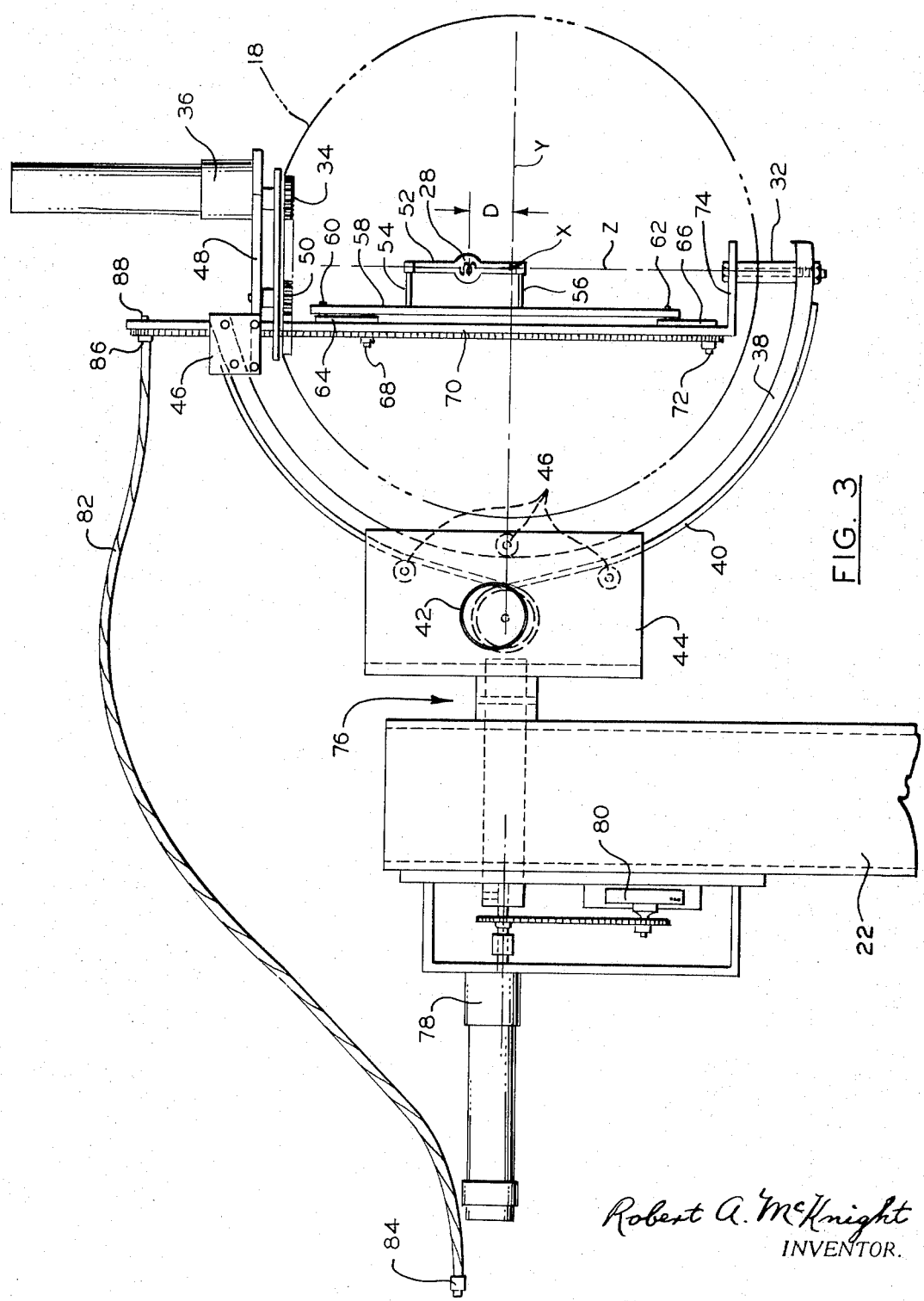
FIG. 3 is a side elevational view of an exemplary embodiment of the structure of the invention.

Mechanical details of mounting and moving transparency 18 are shown in more detail in FIG. 3. The transparency is supported at its base upon mounting member 32, and is rotatable about an axis through such member to simulate visually changes in heading. Transparency 18 is rotatable in the heading or yaw (Z) axis by rotation of gear 34, which engages an opening in the top of transparency 18, upon actuation of drive means 36, e.g., an electric motor. Mounting member 32 is supported upon semi-circular member 38 to which flexible element 40 is affixed near its ends. Element 40 passes around a pulley which is driven by pitch drive means 42, supported on mounting bracket 44. Mounted on the same bracket are guide rolls or sprockets 46 which aid in supporting and constrain the path of movement of members 38 and 40, whereby transparency 18 may be rotated about a simulated pitch axis, normal to the plane of the paper in FIG. 3 and indicated by the letter X. Attached to the upper end of semicircular member 38 is plate 46 which, in turn, supports bracket 48 for mounting heading drive motor 36 and idler gear 50.

Light source 52, comprising a point light source of the xenon arc type, for example, is supported in two appropriate terminals on arms 54 and 56 extending from first support bar 58. The latter is pivotally attached at its ends by pins 60 and 62 to links 64 and 66, respectively. Pin 68 extends from the end of link 64 opposite pin 60 through second support bar 70. Pin 72 likewise extends through support bar 70 from the end of link 66 opposite pin 62. Second support bar 70 includes end portion 74 by means of which the entire light source support structure is affixed to mounting member 32, whereby second support bar 70 is fixed with respect to transparency 18 for rotation about the pitch (X) and roll (Y) axes.

The entire structure thus far described in FIG. 3 is supported for rotation about the Y axis on bearing means 76, fixedly mounted on column 22. Roll drive means 78 is effective to rotate the structure about the Y axis, and is connected in conventional manner to a position transducer such as follow-up potentiometer 80. The structure described is thus effective to rotate transparency 18 about the X, Y and Z axes indicated in FIG. 3.

Figure 4:
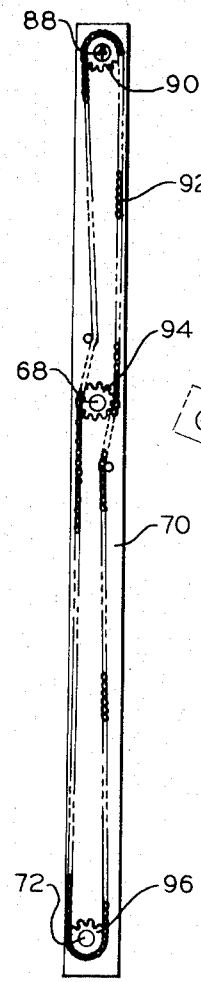
FIG. 4 is a rear elevation of a portion of the structure of FIG. 3.

Cable or rod 82 is laterally flexible but torsionally rigid; one end 84 is rotationally fixed, whereby the other end 86 likewise will not rotate as the cable is moved laterally. End 86 is fixed to pin 88 which is pivotally mounted in support bar 70. Sprocket 90 (FIG. 4) is attached to pin 88 for rotation therewith. Chain 92 passes over sprocket 90, and likewise engages sprockets 94 and 96. The latter are respectively connected to pins 68 and 72 to rotate the pins, and thereby links 64 and 66, as chain 92 moves over the sprocket.

Figure 5:
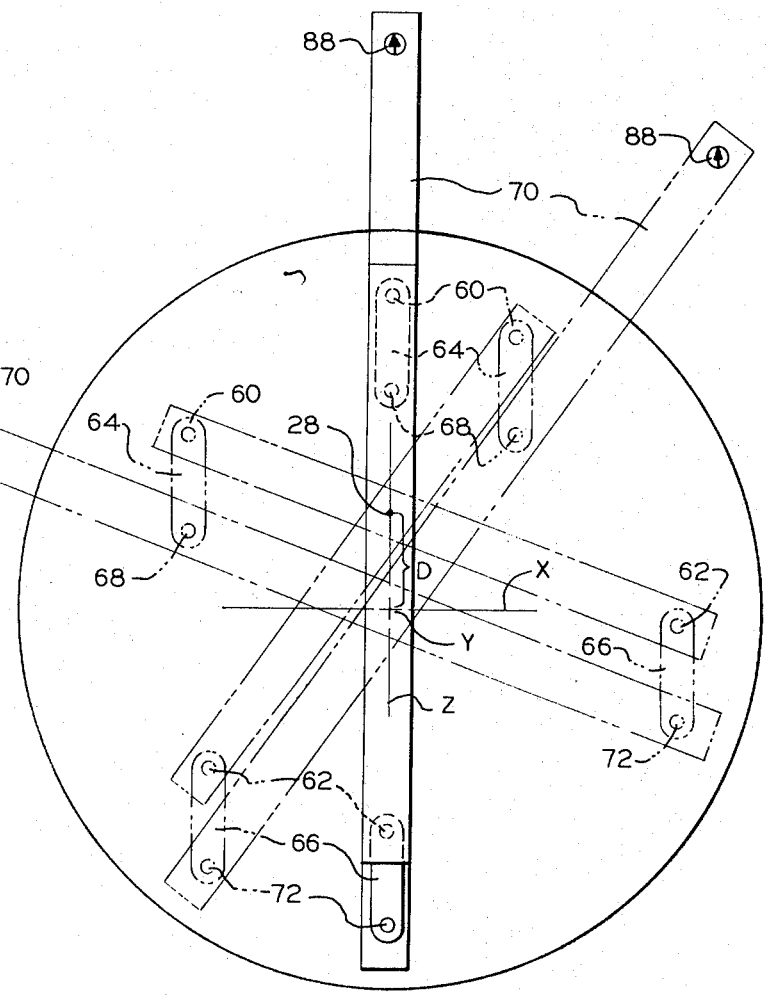
FIG. 5 is a front elevation of a portion of the structure of FIG. 3 showing certain elements in various positions during operation of the invention.

Support arms 58 and 70 are shown in FIG. 5 in three positions as transparency 18 is rotated about the roll axis. The arrow on pin 88 indicates that the pin remains in the same rotational orientation, due to its connection with non-rotatable cable 82, as support arm 70 is rotated. Due to the action of chain 92, pins 68 and 72 are thereby links 64 and 66 will also remain in a constant rotational orientation. It is apparent that support bars 58 and 70, with links 64 and 66, form a four-bar parallelogram linkage.

As shown in FIG. 5, links 64 and 66 are vertically aligned and remain so as the structure is rotated about the Y axis. The distance between pivots 60 and 68 of link 64 and the distance between pivots 62 and 72 of link 66 is the same as the distance between point 28 and the intersection of the rotational axes, i.e., distance D. Thus, as support bar 70 is rotated about the Y axis, point 28 will remain vertically aligned with such axis. Since the position of the point light source is fixed with respect to the roll axis, the earlier described error in visual simulation is effectively eliminated.

Actuation of drive means 36, 42 and 78 may be made responsive to movement of the controls of trainer 10 by conventional means well-known in the art. Such actuation is preferably coordinated with movement of student station 14 on motion base 12 to provide an integrated system of sensory perceptions. For example, it has been found that effective motion cues are provided to the trainee by orienting the student station at some predetermined fraction of the assumed orientation of an actual aircraft flying under the same conditions. That is, the component of forward motion in an actual aircraft has an appreciable effect on rotational motion cues sensed by the pilot and the forward component, of course, is not present in the trainer. In a steep bank turn, for example, an orientation of the trainer cockpit at only a few degrees of roll would provide a perceptual cue to the trainee similar to that experienced in an actual aircraft blanked at 45°. The actual relationship would depend, of course, on factors such as the speed of the aircraft, the relationship between roll angle and rate of heading change, etc. A common design parameter in small flight trainers having rotational motion capability is to rotate the trainer cockpit one degree about the roll axis for every 6° of indicated roll of an actual aircraft. The visual system provided by the spherical transparency in the present invention would be rotated by an amount equal to the remaining five of each 6° of indicated roll, thereby maintaining the proper visual orientation between the trainee and the projected scene. Movement of the trainer cock-pit about the pitch axis is also commonly a predetermined fraction of the actual aircraft movement being simulated, but not such a small fraction as roll movement. For example, while roll movement may be one-sixth of the actual motion simulated, pitch motion is usually about one-half. This may be easily coordinated with rotation of the transparency about the pitch axis to provide a more exact visual indication of the simulated change in viewpoint, but any error due to the position of the light source at other than the pitch axis of rotation will be small enough to be neglected. This is particularly true since rotational movements about the roll axis in normal flight of small aircraft are much greater than movements about the pitch axis. Relative movement of the transparency and trainer cockpit about the yaw axis would be in a one-to-one relationship with the actual movement being simulated and may be coordinated, i.e., the motion apportioned between transparency and trainer, as desired.

What is claimed is:

1. A projected-image visual system for a grounded flight trainer, or the like, said system comprising, in combination:
    a. a spherical transparency bearing an image of a real-world scene;
    b. a point light source for projecting a viewable image of said real-world scene;
    c. first structure supporting said point light source with the point from which light emanates displaced from the geometric center of said spherical transparency;
    d. second structure supporting said first structure and attached to said spherical transparency for movement therewith;
    e. first means for moving said spherical transparency about a first axis through the geometric center thereof and displaced from said point; and
    f. second means for effecting relative movement of said first and second structures in response to movement of said spherical transparency to maintain the position of said point fixed with respect to said geometric center.

2. The invention according to claim 1 wherein said first and second structures comprise a first pair of parallel bars of a pivotally connected, four-bar, parallelogram linkage.

3. The invention according to claim 2 and further including means for maintaining the second pair of bars of said linkage in a constant rotational orientation as said first pair of bars is rotated.

4. The invention according to claim 3 wherein said second structure is rotated with said transparency about said first axis and the distance between the pivotal connections of each of said second pair of bars with opposite bars of said first pair is equal to the distance between said first axis and a line parallel thereto through said point.

5. The invention according to claim 4 wherein the pivotal connections of each of said second pair of bars with the bar of said first pair comprising said second structure are rotationally connected to one another, whereby said second pair of bars are maintained in a fixed rotational orientation with respect to one another.

6. The invention according to claim 5 wherein pivotal connections of said second pair of bars are rotationally connected by a sprocket and chain arrangement.

7. The invention according to claim 6 wherein said sprocket and chain arrangement includes a master sprocket supported on said second structure remote from said pivotal connections thereon of said second pair of bars and said master sprocket is restrained against rotational movement about its own axis as the bar comprising said second structure is rotated about said axis.

8. The invention according to claim 7 wherein said master sprocket is restrained against rotational movement by a member having torsional rigidity and lateral flexibility, said member being affixed to said master sprocket and restrained against rotational movement.

* * * * *